(12) United States Patent
Xu et al.

(10) Patent No.: US 12,499,374 B2
(45) Date of Patent: Dec. 16, 2025

(54) EXTRACTING AND CLASSIFYING ENTITIES FROM DIGITAL CONTENT ITEMS

(71) Applicant: Microsoft Technology Licensing, LLC, Redmond, WA (US)

(72) Inventors: Mingyang Xu, Redmond, WA (US); Paul Pangilinan Del Villar, Bothell, WA (US); Xiaofei Zeng, Redmond, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 992 days.

(21) Appl. No.: 17/566,418

(22) Filed: Dec. 30, 2021

(65) Prior Publication Data
US 2023/0214679 A1    Jul. 6, 2023

(51) Int. Cl.
*G06N 5/025* (2023.01)
*G06F 18/2113* (2023.01)
*G06F 18/214* (2023.01)
*G06F 40/30* (2020.01)

(52) U.S. Cl.
CPC ......... *G06N 5/025* (2013.01); *G06F 18/2113* (2023.01); *G06F 18/214* (2023.01); *G06F 40/30* (2020.01)

(58) Field of Classification Search
CPC .... G06F 40/30; G06F 18/2113; G06F 18/214; G06N 5/025
See application file for complete search history.

(56) References Cited

U.S. PATENT DOCUMENTS

| | | | |
|---|---|---|---|
| 11,288,542 B1 * | 3/2022 | Samplawski | G06N 3/08 |
| 11,321,615 B1 * | 5/2022 | Genkin | G06F 16/90335 |
| 12,169,526 B2 * | 12/2024 | Del Villar | G06F 16/358 |
| 2007/0011134 A1 * | 1/2007 | Langseth | G06F 16/254 |
| 2017/0017721 A1 * | 1/2017 | Sauper | G06F 16/248 |
| 2018/0032636 A1 * | 2/2018 | Mullaney | G06N 5/022 |
| 2019/0278777 A1 | 9/2019 | Malik et al. | |
| 2019/0332620 A1 * | 10/2019 | Wason | G06F 40/30 |
| 2022/0164683 A1 * | 5/2022 | Hao | G06F 16/35 |
| 2023/0350931 A1 * | 11/2023 | Lewis | G06F 16/338 |
| 2024/0232539 A1 * | 7/2024 | Venkateshwaran | G06N 3/044 |

OTHER PUBLICATIONS

"International Search Report and Written Opinion Issued in PCT Application No. PCT/US22/051885", Mailed Date: Mar. 28, 2023, 12 Pages.
Communication pursuant to Article 94(3) received in European Application No. 22847648.7, mailed on May 19, 2025, 09 pages.

* cited by examiner

*Primary Examiner* — Barbara M Level
(74) *Attorney, Agent, or Firm* — Ray Quinney & Nebeker P.C.; James S. Bullough (57) ABSTRACT

The present disclosure relates to extracting entities from a collection of digital content items based on text from within the digital content items. For example, the present disclosure describes a customizable entity extraction system that utilizes a number of models to extract entities, rank entities, and classify certain entities using a combination of rule-based and machine learning approaches. In one or more embodiments, a customizable entity extraction system applies a set of rules to unstructured text of a collection of digital content items to extract and classify a set of entities in connection with a specific domain of interest.

20 Claims, 6 Drawing Sheets

EXTRACTING AND CLASSIFYING ENTITIES FROM DIGITAL CONTENT ITEMS

BACKGROUND

Recent years have seen a significant increase in the use of computing devices (e.g., mobile devices, personal computers, server devices) to create, store, analyze, and present data from various sources. Indeed, tools and applications for collecting, analyzing, classifying, and ultimately presenting data are becoming more and more common. These tools provide a variety of features for extracting and presenting data about various categories and entities of interest. As tools for collecting, analyzing, classifying, and ultimately presenting data become more complex, however, conventional methods for processing this data present a number of limitations and drawbacks.

For example, many conventional techniques for collecting and extracting data from digital content items often relies on focus groups and surveys for collection and analysis of data from individuals. Other techniques may require that specific content have a particular format or that relevant content originate or be published from a specific platform to enable specialized software tools to extract data from the properly formatted data. Each of these techniques for collecting and analyzing data often involve significant costs as a result of time and manpower needed to collect sufficient data and gain meaningful insights. Moreover, even where these data collection techniques are comprehensive and accurate, they are often limited to a specific snapshot of data at a particular moment in time that becomes obsolete over a relatively short amount of time.

Other approaches involve computer-based approaches to extracting and analyzing data from a corpus of content. As will be discussed in further detail herein, however, these approaches often suffer from overly broad rules that output largely irrelevant results. Alternatively, these approaches are often very specific to a particular industry or domain, and lack any ability to customize extraction of entities from the content across different industries.

These and other problems exist in connection with collecting, analyzing, and presenting data.

DETAILED DESCRIPTION

The present disclosure relates to systems and models for extracting entities (e.g., terms, concepts, categories) from a collection of digital content items based on text (e.g., unstructured text) from within the digital content items. For example, the present disclosure describes features and functionality of a customizable entity extraction system that utilizes a number of models to extract entities, rank entities, and classify entities using a combination of approaches that utilize different algorithms and concepts to extract and analyze text content of the digital content items. Indeed, one or more embodiments described herein involve a combination of rule-based and machine learning models that can be used to extract entities from unstructured text portions of digital content items and classify the extracted entities in connection with a particular domain or with respect to user-defined categories.

As an illustrative example, and as will be discussed in further detail below, a customizable entity extraction system may receive a plurality of digital content items and apply a rule-based model to the digital content items to extract a collection of entities (e.g., terms) from the digital content items. The customizable entity extraction system may additionally apply an entity ranking model to the entities to determine an importance score for each entity from the extracted collection of entities to indicate a metric of importance for each of the entities within the corpus of digital content items. The customizable entity extraction system may further receive one or multiple candidate terms (e.g., a category, concept, or other term(s) having a semantic meaning) associated with a domain of interest and apply a classification model to the extracted entities to determine a subset of the entities that are relevant to the candidate term and thus important to the particular domain of interest.

The present disclosure provides a number of practical applications that provide benefits and/or solve problems associated with extracting and analyzing data from digital content items. By way of example and not limitation, some of these benefits will be discussed in further detail below.

For example, as noted above, conventional rule-based approaches to extracting data are often overinclusive and produce a significant number of non-relevant results when applied to a corpus of text content. In contrast, the customizable entity extraction system utilizes a rule-based approach in combination with other models (e.g., ranking model, classification model) to avoid returning a large number of irrelevant results when extracting and analyzing text from a corpus of digital content items.

Moreover, where many model-based (e.g., machine learning model-based) approaches are often overly specific to a particular industry and require domain-specific knowledge to produce relevant results, the customizable entity extraction system described herein combines a rule based approach in combination with a zero-shot classification model to achieve broad applicability as well as extracting relevant entities from text content of digital content items. Indeed, as will be discussed in further detail below (e.g., in connection with FIG. 4), the customizable entity extraction system may yield an effective balance of relevant results relative to conventional systems that rely primarily on rule-based models or machine learning models when extracting and analyzing data from digital content items.

In addition to providing a balanced approach to extracting and analyzing data to determine key entities, the customizable entity extraction system provides an ability to customize classification of extracted entities from a corpus of digital content items. For example, where an individual or organization is interested in learning which terms and phrases are being used in connection with specific categories or domain-specific terms, the customizable entity extraction system provides a framework in which an individual or organization can provide specific terms or categories as input to a classification model to determine associations between a listing of extracted entities and the provided domain-specific terms. In this way, users across different industries can take advantage of the framework of the customizable entity extraction system in identifying which entities are being mentioned in connection with a specific domain. Moreover, even within the same domain, an individual or organization can provide additional domain-specific terms to learn more about how certain terms are being used in connection with new or emerging terms within a relevant domain. These candidate terms can be customized on the fly and applied to a set of extracted entities without requiring that rule-based model and/or entity ranking model be re-applied to a large corpus of digital content items.

In addition to providing a customizable approach that provides specific and relevant results, the customizable entity extraction system additionally provides a pipeline of extraction, analysis, and classification models that, when combined as described herein, can significantly reduce expense of computing resources when extracting and analyzing data from digital content items. For example, by applying a rule-based model to identify a set of entities, the customizable entity extraction system can direct the analysis of an entity ranking model and a classification model to a specific set of terms rather than applying one or more machine learning models to unstructured text generally. This extracted data not only limits the data provided to the machine learning models, but provides additional parameters that enables the various models of the customizable entity extraction system to effectively determine associations between entities and domain-specific terms without expending considerable computing resources as would normally be required with a processing pipeline that relies primarily on more robust machine learning models.

The embodiments described herein further represent dramatic improvement over human-driven methods due to customization, modifying over time, and dynamically updating the results based on new and current data. Indeed, specific features of the customizable entity extraction system may enable extraction, analysis, and association of various entities and candidate terms as new entities are used with respect to a particular domain. In addition, the customizable entity extraction system may be applied on incoming digital content items that are received over time rather than applying a one-shot approach to an entire corpus of content anytime an individual or organization wants a current state of associations between entities of a corpus of digital content items and at least one domain specific term.

In addition, and as will be described in further detail below, the customizable entity extraction system provides a unique approach and workflow pipeline that is applicable to a wide variety of content originating from a variety of sources that may or may not have different data formats. For example, because the rule-based method can apply a set of rules that are applicable to unstructured text (e.g., rather than a specific format), the customizable entity extraction system is applicable to any of a number of platforms that enable users to share or publish digital content having text associated therewith. For example, the customizable entity extraction system may receive and apply the below-described features and functionality to digital content items originating from social networking systems, blog platforms, customer feedback forms (e.g., surveys), transcriptions of phone calls, or any other communication platform in which digital content can be made accessible to the customizable entity extraction system.

As illustrated in the foregoing discussion, the present disclosure utilizes a variety of terms to described features and advantages of one or more embodiments of the customizable entity extraction system. Additional detail will now be provided regarding the meaning of some of these terms. Further terms will also be discussed in detail in connection with one or more embodiments and specific examples below.

As used herein, a "digital content item" or "content item" may refer to a defined portion of digital data (e.g., a data file). Examples of digital content items include digital images, video files, audio files, streaming content, and/or folders that include one or more digital content item. In one or more embodiments described herein, a digital content item refers specifically to a content item having text associated therewith. For example, a digital content item may include a social media post that includes text alone or in combination with audio and/or visual content. In one or more embodiments, a digital content item may refer to a document, blog post, a user comment, a review, or any other digital content that is accessible to the graph generation system and which includes a string of text that may be analyzed, parsed, or otherwise processed in accordance with one or more embodiments described herein. In one or more embodiments, a digital content item refers to a portion of text included within a single posting or file. For example, in one or more implementations, a digital content item may refer to individual sentences or paragraphs of a document that includes multiple sentences or paragraphs therein. Thus, in one or more embodiments described herein, a digital content item may refer to a portion of text from a content item that includes multiple portions of text.

As noted above, and as will be discussed in further detail herein, the customizable entity extraction system may receive, access, or otherwise obtain digital content items from a variety of sources including, by way of example, a social networking system or platform. As used herein, a "social networking system" or "social networking platform" may refer to any communication platform on which digital content items can be stored and shared between users of the communication platform. In one or more embodiments, digital content items may be collected from a set of digital content items that have been posted publicly or that have been made accessible publicly to other users of the social networking system.

As used herein, an "entity" or "concept" may refer interchangeably to a term or a set of multiple terms (e.g., related terms) associated with a digital content item. In one or more embodiments described herein, an entity refers to a set of one or more terms extracted from a text portion of a digital content item by one or more models (e.g., a rule-based model) applied to the digital content item. An entity may refer to any term, set of terms, or any searchable object that is identifiable within a digital content item and defined by a policy or rule. For example, in one or more embodiments, an entity or concept may refer to a specific term, set of related terms, a hashtag, a uniform resource locator (URL), a domain address, a filename, or any searchable object within the digital content item(s). As will be discussed in further detail below, an entity may be analyzed and scored to determine if the entity is representative of a key concept or key concept term from an associated digital content item. For example, as will be discussed herein, a set of entities may be extracted from one or more digital content items and analyzed to determine a subset of entities (e.g., key entities) representative of key concepts from within the digital content item(s).

As used herein, a "key concept" or "key entity" may refer to an entity from an identified collection of entities that is determined to be of interest or have a threshold metric of importance with regard to a particular domain or domain term(s). For example, in one or more embodiments described herein, a key entity refers to an entity or concept from an identified collection of entities that falls within a subset of entities that are associated with one or more candidate terms from a particular domain of interest.

As used herein, "candidate terms" may refer to any number of terms that are received in connection with a domain of interest. As used herein, a domain of interest may refer to any topic or subject for which an individual or organization is interested in understanding, particularly in the context of entities and/or key concepts that are extracted from digital content items. As will be discussed below, the customizable entity extraction system may receive one or more candidate terms associated with a particular organization or general topic. In one or more embodiments, the candidate terms are specifically received from an individual or organization based on a desire to understand which entities from a collection of entities are associated with a specific set of candidate term(s).

Figure 1:
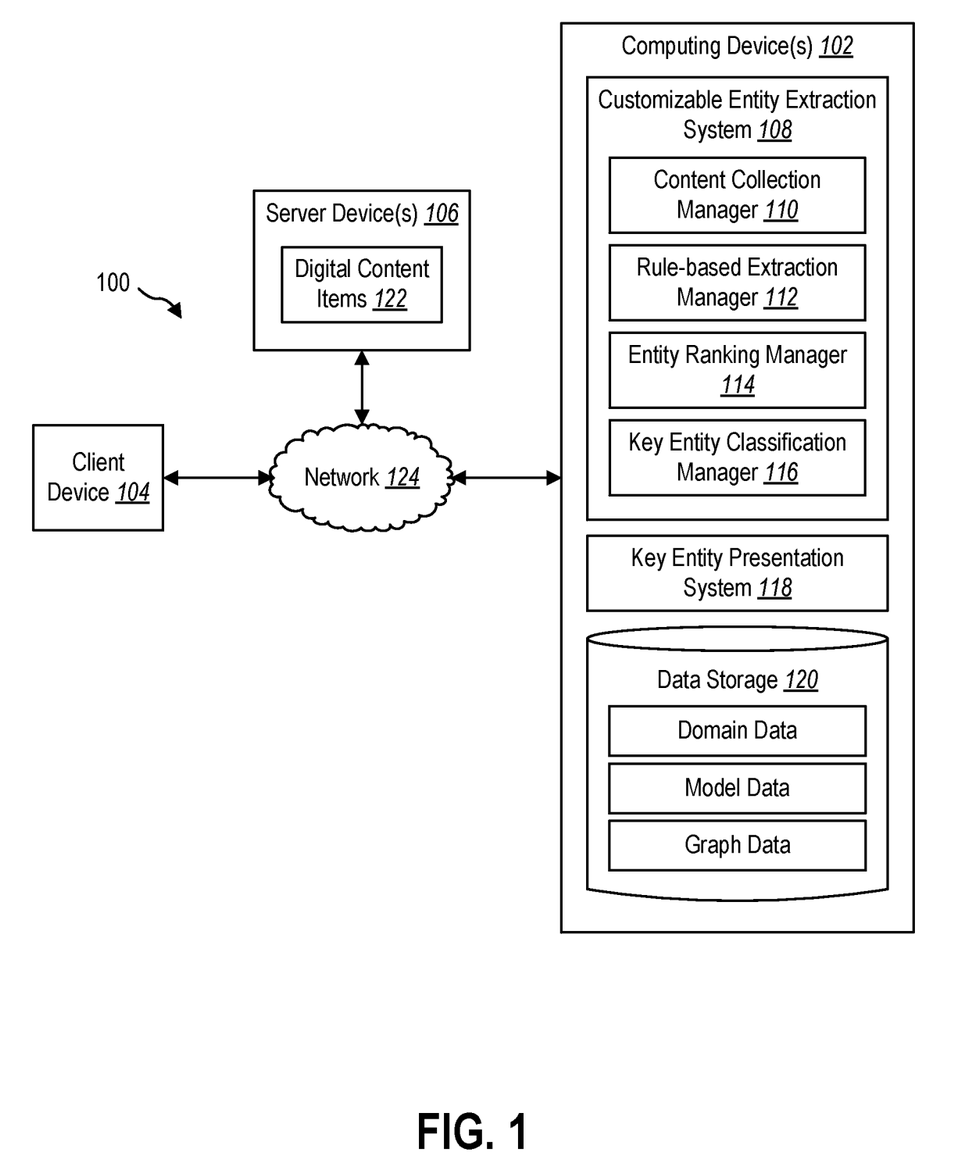
FIG. 1 illustrates an example environment including a customizable entity extraction system in accordance with one or more embodiments.

Additional detail will now be provided regarding a customizable entity extraction system in accordance with one or more example implementations. For example, FIG. 1 illustrates a block diagram showing an environment 100 having one or more computing device(s) 102 on which a customizable entity extraction system 108 may be implemented in accordance with one or more embodiments. The environment 100 additionally includes a client device 104 and one or more server device(s) 106 providing access to a plurality of digital content items 122 (e.g., publicly accessible digital content items shared via one or more communication platforms).

As shown in FIG. 1, the computing device(s) 102, client device 104, and server device(s) 106 may communicate with each other directly or indirectly through a network 124. The network 124 may include one or multiple networks and may use one or more communication platforms or technologies suitable for transmitting data. The network 124 may refer to any data link that enables the transport of electronic data between devices and/or modules of the environment 100. The network 124 may refer to a hardwired network, a wireless network, or a combination of hardwired and wireless networks. In one or more embodiments, the network 124 includes the Internet.

The computing device(s) 102, client device 104, and/or server device(s) 106 may refer to various types of computing devices. For example, in one or more embodiments, the client device 104 may include a mobile device, such as a mobile telephone, a smartphone, a PDA, a tablet, or a desktop. In one or more embodiments, the client device 104 may include a non-mobile device such as a desktop computer, server device, or other non-portable device. In one or more embodiments described herein, the computing device(s) 102 refers to one or more server devices of a cloud computing system accessible to a client device 104 operated by a user. In one or more implementations, the server device(s) 106 refers to one or more third-party server device(s) independent from the computing device(s) 102. Each of the computing device(s) 102, client device 104, and server device(s) 106 may include features and functionality described below in connection with FIG. 6.

As shown in FIG. 1, and as will be discussed in further detail below, the customizable entity extraction system 108 may include a number of components for performing acts and providing functionalities described herein. By way of example, the customizable entity extraction system 108 may include a content collection manager 110, a rule-based entity extraction manager 112, an entity ranking manager 114, and a key entity classification manager 116. As further shown, the computing device(s) 102 may include a key entity presentation system 118 and a data storage 120 that provides access to various types of data to components of the customizable entity extraction system 108.

It will be understood that while FIG. 1 illustrates an example in which each of the illustrated components 108-120 are implemented in whole on the computing device(s) 102, other implementations may include one or more components (or sub-components) implemented across different devices of the environment 100. As a non-limiting example, one or more of the content collection manager 110, rule-based entity extraction manager 112, entity ranking manager 114, key entity classification manager 116, and/or key entity presentation system 118 may be implemented on different computing devices (e.g., on different server nodes of a cloud computing system or across different cloud computing platforms altogether). As another example, while FIG. 1 shows the key entity presentation system 118 on the computing device(s) 102, one or more features of the key entity presentation system 118 may be implemented on the client device 104, such as on a software application executing on the client device 104 configured to process search queries and generate a presentation based on analysis and extraction of key concepts from a corpus of digital content items 122. Thus, while one or more embodiments described herein will be discussed in connection with a similar configuration of components as shown in FIG. 1, features and functionalities of the systems and applications described herein may similarly apply to other device environments.

As mentioned above, the customizable entity extraction system 108 may include a content collection manager 110. The content collection manager 110 may receive, collect, or otherwise obtain access to text content from a collection of digital content items 122. For example, in one or more embodiments, the content collection manager 110 collects or otherwise accesses digital content items 122 from a social networking system hosted by the server device(s) 106. In one or more embodiments, the content collection manager 110 collects digital content items 122 from a plurality of communication platforms on which users can share digital content. As noted above, the digital content items 122 may have different formats or combinations of text content and visual content. Nevertheless, in one or more embodiments, the content collection manager 110 obtains access to text portions of the digital content items 122 for use in further processing by the customizable entity extraction system 108. In one or more embodiments, the text portion includes unstructured text from one or multiple digital content items. In one or more embodiments, the content collection manager 110 exclusively collects digital content items that have been made publicly accessible by individuals that uploaded or otherwise shared the digital content items to other users of a communication platform (e.g., a social networking system).

As shown in FIG. 1, the customizable entity extraction system 108 may also include a rule-based entity extraction manager 112. As will be discussed in further detail below, the rule-based entity extraction manager 112 may apply a rule-based extraction model to the digital content items 122 to extract any number of entities (e.g., terms) from the digital content items 122. In one or more embodiments, the rule-based entity extraction manager 112 applies a rule-based extraction model to text portions (e.g., unstructured text) of the digital content items 122 to identify terms or sets of related terms based on the rules or policies of the rule-based extraction model. In one or more embodiments, the rule-based model may refer to a static set of rules that can be uniformly applied to portions of text to identify one or more terms based on characteristics of the terms and the specific set of rules. For instance, in one or more embodiments, the entity extraction manager 112 may apply a set of rules configured to identify certain types of terms, such as nouns, topics, adjectives, or certain phrases (or even specific terms) that may be identified based on the set of rules and associated characteristics of the text portion(s) of the digital content items 122.

As further shown, the customizable entity extraction system 108 may include an entity ranking manager 114. As will be discussed in further detail below, the entity ranking manager 114 may evaluate the entities extracted from the digital content items 122 and determine a metric of importance associated with the extracted entities. For example, in one or more embodiments, the entity ranking manager 114 may apply an entity ranking model that has been trained to evaluate certain terms in connection with a corpus of text (e.g., from a digital content item or corpus of digital content items) to determine a metric of importance of the various term(s) with respect to the collection of digital content items. In one or more implementations, the entity ranking model refers to a machine learning model that has been trained on a corpus of training data to determine which term(s) from a corpus of text content (or digital content items) are important relative to other terms within the corpus of text content. In one or more embodiments, the entity ranking manager 114 determines an importance score for each of the terms extracted from the digital content items 122 by the rule-based extraction manager 112.

As further shown, the customizable entity extraction system 108 may include a key entity classification manager 116. As will be discussed in further detail below, the key entity classification manager 116 may receive one or more candidate terms associated with a domain of interest. As noted above, the candidate term(s) may include any term or set of terms having a semantic meaning. For instance, a candidate term may refer to any term that has a plain meaning that can be observed or identified by a classification model (e.g., a zero-shot classification model).

Upon receiving the candidate term(s), the key entity classification manager 116 may then apply a classification model to the extracted entities to determine a subset of entities (e.g., key entities of interest) associated with the one or more candidate terms. In one or more embodiments, the key entity classification manager 116 applies a machine learning model to the entities to identify the key entities of interest. In one or more implementations, the key entity classification manager 116 applies a zero-shot machine learning model to the entities and candidate terms to selectively identify which of the extracted entities are of most interest to a particular domain of interest.

Upon extracting the entities and determining a subset of the entities that are important or otherwise associate with a particular domain of interest, one or more embodiments may involve generating and presenting the evaluated data via a graphical user interface (e.g., of the client device 104). For example, in one or more embodiments, a key entity presentation system 118 may generate and present a correlation graph object that includes associations between various key entities and candidate terms. The key entity presentation system 118 may further generate a presentation in which the correlations are displayed to indicate metrics of importance associated with co-occurrence of the various concepts and terms within the digital content items 122.

For example, in one or more embodiments, the key entity presentation system 118 may generate a searchable graph including information about frequency of co-occurrences between various entities as well as between the entities and various candidate terms. The searchable graph may further include information about the determined metrics of importance for each of any number of key entities with respect to a given collection of digital content items 122. The key entity presentation system 118 may further enable a client device 104 to process or provide a query that enables an individual to search the graph and view a presentation of the searchable graph that provides a visual representation of the co-occurrences and metrics of importance with respect to the entities and candidate terms. In one or more embodiments, the key entity presentation system 118 may incorporate features and functionalities of a graph generation system described in connection with U.S. patent application Ser. No. 17/484,670 titled GENERATING AND PRESENTING A TEXT-BASED GRAPH OBJECT, which is incorporated herein by reference in its entirety.

As further shown in FIG. 1, the customizable entity extraction system 108 may include a data storage 120 including various types of data accessible to the components 108-118 described herein. For example, as shown in FIG. 1, the data storage 120 may include domain data. The domain data may include any information associated with a corresponding domain of interest. For example, the domain data may include any number of candidate terms that are provided as an input to the customizable entity extraction system 108. In one or more embodiments described herein, the domain data may include candidate terms, which may refer to terms that are generated for a specific domain by an individual or organization based on observed trends in connection with a particular area of interest.

As further shown, the data storage 120 may include model data. The model data may include any information associated with the various models used in processing and analyzing the digital content items as well as identifying the subset of key entities and associated importance scores. For example, the model data may include information about a rule-based model that is used to identify any number of terms or entities from text portions of a collection of digital content items 122. The model data may further include information about a scoring model that is used to determine metrics of importance with respect to the identified entities from the digital content items 122. In one or more embodiments, the model data may include a classification model (e.g., a zero-shot classification model) used for determining which of an extracted set of entities are associated with one or more candidate terms.

Figure 2:
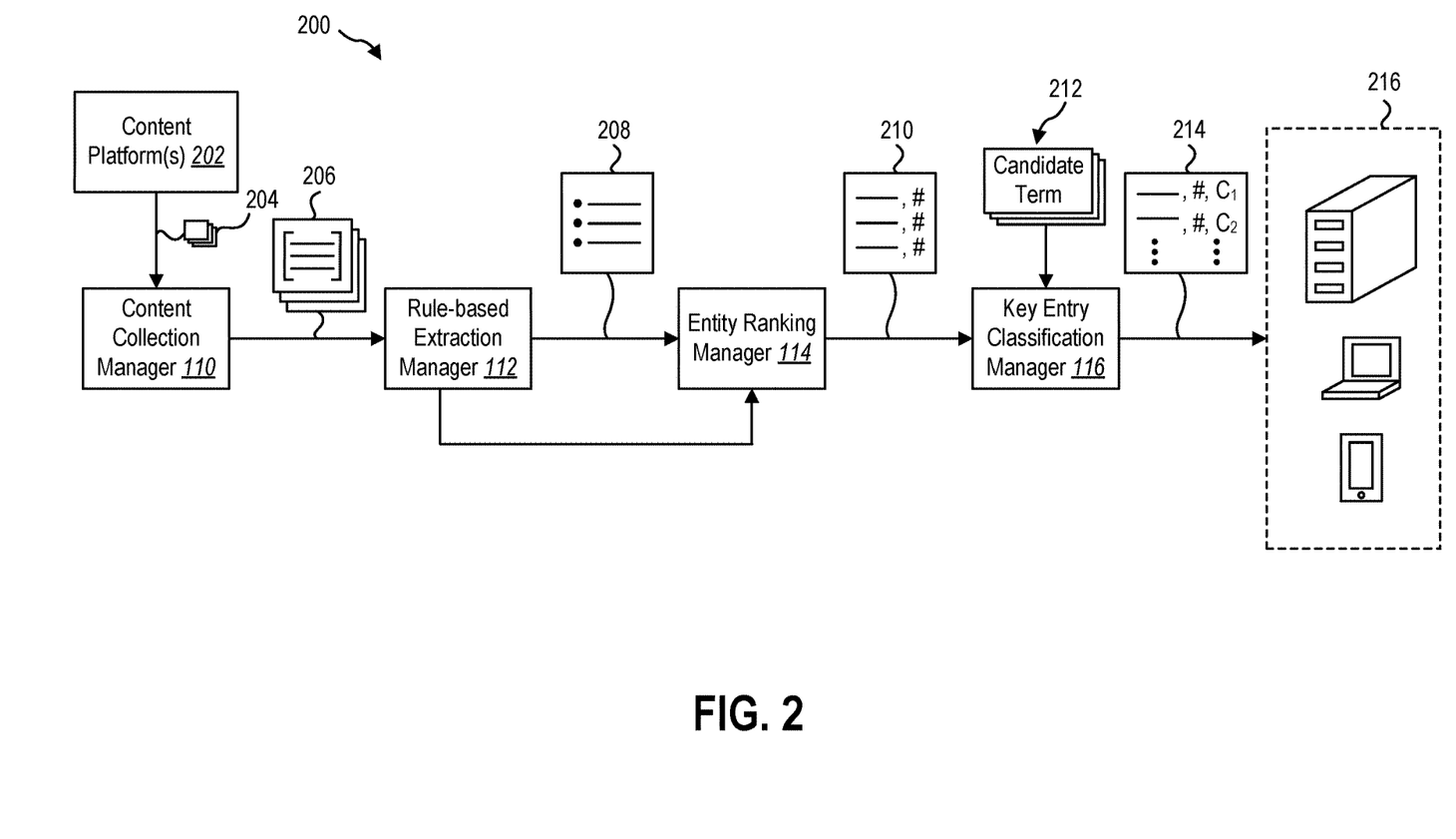
FIG. 2 illustrates an example workflow showing an implementation of the customizable entity extraction system in accordance with one or more embodiments.

Additional detail will now be discussed in connection with an example workflow 200 showing an implementation of the customizable entity extraction system 108 in accordance with one or more embodiments described herein. In particular, FIG. 2 illustrates an example workflow 200 showing example acts that that may be performed by components of the customizable entity extraction system 108 in extracting entities from digital content items, determining relative importance of the extracted entities from the set of digital content items, and identifying subset of key entities having particular importance to a domain of interest. It will be understood that the workflow 200 of FIG. 2 is provided by way of example and may include any of the features and functionalities described above in connection with FIG. 1 as well as additional examples discussed herein.

As shown in FIG. 2, the content collection manager 110 may interact with one or more content platforms 202 and access digital content items 204 shared or otherwise accessible thereon. By way of example, the content platform(s) 202 may refer to one or more social networking platforms over which digital content items are shared by users of the platforms. Nevertheless, examples described in connection with one or more social networking platforms may similarly apply to any content platform over which digital content items may be accessible to components of the customizable entity extraction system 108, even where the content items from the respective platforms have different formats.

In one or more embodiments, the content collection manager 110 mines digital content items 204 from the content platforms 202 and harvests text portions 206 from any number of digital content items 204. As shown in FIG. 2, the content collection manager 110 may receive a collection of digital content items 204 including some combination of multimedia content and/or unstructured text and extract text portions 206 from the digital content items 204. In one or more embodiments, the content collection manager 110 may identify text portions 206 of the digital content items 204 including unstructured text. For example, the text portions 206 may include discrete portions of text referring to specific sentences, paragraphs, or posts from the respective digital content items 204. For example, where a digital content item includes a social media post having multiple sentences or paragraphs, the content collection manager 110 may identify discrete portions of text corresponding to individual sentences or paragraphs to consider individually or within a context of an associated digital content item.

By harvesting text content, including unstructured text, from the digital content items 2094, the content collection manager 110 enables additional components of the customizable entity extraction system 108 to selectively identify key entities from the text portions independent from the specific formats of the digital content items from different communication platforms 122. In addition, by selectively extracting the text portions 206, the content collection manager 110 enables evaluation and identification of key entities from different types of digital content items, such as social networking posts, documents, Internet blogs, etc. Moreover, by extracting the text content as discussed herein, the content collection manager 110 enables additional components of the customizable entity extraction system 108 to evaluate text content using fewer processing resources than would be involved in evaluating non-text portions, such as images, videos, and other multi-media content from the digital content items 204.

As shown in FIG. 2, the content collection manager 110 may provide the text portions 206 of the digital content items 204 to the rule-based extraction manager 112. The rule-based extraction manager 112 may apply one or more rule-based models to the digital content items 204 (e.g., the text portions 206 of the digital content items 204). As mentioned above, in one or more embodiments, the rule-based model(s) may refer to one or more algorithms, policies, or models having a static set of defined rules for identifying certain terms (or related groupings of terms) within a given set of text.

In one or more embodiments, the rule-based extraction manager 112 applies a rule-based model that includes rules associated with identifying entities (e.g., terms or strings of multiple related terms) based on characteristics of the text portions 206. For example, the rule-based model may include rules for identifying specific types of terms, such as nouns, pronouns, adjectives, etc. The rule-based model may additionally consider characteristics of the text, such as a presence of a capitalized letter, a hashtag, or other identifiable trait of the text portions 206 of the digital content items 204. In one or more embodiments, the set of rules applied by the rule-based extraction manager 112 may be overly inclusive to ensure that few terms that may be relevant to the digital content items 204 will be excluded. Thus, it will be understood that the rule-based model may be configured to identify more terms than will likely be important to a collection of digital content items 204 and/or relevant to a domain of interest.

As shown in FIG. 2, the rule-based extraction manager 112 may identify a set of entities 208 including any number of entities identified based on applying the rule-based model(s) to the text portions 206 of the digital content items 204. As further shown in FIG. 2, the rule-based extraction manager 112 may provide the set of entities 208 to the entity ranking manager 114 for further evaluation.

The entity ranking manager 114 may apply an entity ranking model to the set of entities 208 to determine an importance score for the respective entities from the set of entities 208. In one or more embodiments, the entity ranking manager 114 may apply an entity ranking model trained to output an importance score for a given entity within a context of a digital content item. In one or more embodiments, the entity ranking model is trained to output an importance score for a given entity based on occurrences of the entity within the entire set of digital content items 204. In one or more embodiments, the importance score may be based on a combination of importance within a specific digital content item as well as within the collection of digital content items 204 as a whole.

The entity ranking manager 114 may consider a variety of factors and criteria in determining the importance scores for the set of entities 208. For example, in one or more embodiments, the entity ranking manager 114 may consider relative frequency of the entities within the corpus of text. In one or more embodiments, this may imply that certain terms that are used at a frequency between a low and high threshold are of higher importance than terms that appear less than the low threshold frequency or above the high threshold frequency. In one or more embodiments, the entity ranking manager 114 may consider co-occurrence of the respective entities with other entities of high or low importance. Indeed, the entity ranking manager 114 may consider any number of statistical approaches to predict or otherwise estimate importance of each of the identified entities 208 to determine importance scores associated with each of the identified entities 208.

As mentioned above, and as shown in FIG. 1, the entity ranking manager 114 may receive the set of extracted entities 208 from the rule-based extraction manager 112. In addition, the entity ranking manager 114 may optionally receive each of the text portions 206 of the digital content items 204 as an input to the entity ranking model. In one or more embodiments, the entity ranking manager 114 further receives associations between the respective entities and the associated digital content items 204 to enable the entity ranking manager 114 to consider importance within the respective digital content items as well as importance within the corpus of digital content items 204 as a whole.

As mentioned above, in one or more embodiments, the entity ranking model is a machine learning model that is trained to output an importance score for a given entity based on some combination of the criteria described above. Accordingly, in one or more embodiments, the entity ranking model is trained based on training data that includes portions of unstructured text, associated entities, and ground truth labels indicating metrics of importance for the various entities (e.g., a supervised model). In this manner, the entity ranking model may be trained to emulate the training data and predict which of the entities have a higher or lower metric of associated importance within the text portions 206 of the digital content items 204. Alternatively, in one or more embodiments, the entity ranking model refers to an unsupervised model that does not need ground truth labels.

As shown in FIG. 2, in one or more embodiments, the entity ranking manager 114 generates an entity score report 210 including the identified entities and associated importance scores. In one or more embodiments, the entity score report 210 includes numerical scores indicating metrics of importance (e.g., between 0 and 1) of the various entities. In one or more embodiments, the entity score report 210 includes a ranking of the entities within the set of entities 208. As shown in FIG. 2, the entity ranking manager 114 may provide the entity score report 210 to the key entity classification manager 116 for further analysis.

While not shown in FIG. 2, in one or more embodiments, the entity ranking manager 114 produces a filtered set of entities from the collection of entities based on the determined importance scores. For example, while one or more embodiments of the entity score report 210 may include a full listing of the set of entities 208 and associated importance scores, other implementations of the entity score report 210 may include a filtered set of the identified set of entities 208.

For example, in one or more embodiments, the entity ranking manager 114 may output an entity score report 210 that includes those entities that have higher than a threshold importance score. In one or more embodiments, the entity ranking manager 114 may output an entity score report 210 that includes a top percentage (e.g., top 10%, top 20%, top 50%) of the identified entities or a predetermined top ranked number of entities (e.g., top 10, top 50, top 100). In this manner, the entity ranking manager 114 may reduce a number of the entities to be further evaluated by the key entity classification manager 116 in determining associations between the scored entities and the candidate terms.

As noted above, the entity score report 210 may be provided as an input to the key entity classification manager 116. In addition to the entity score report 210, the key entity classification manager 116 may further receive a set of one or more candidate terms 212 associated with a domain of interest. As indicated above, the candidate terms 212 may refer to any term (or multiple related terms) provided by an individual or organization in connection with a domain of interest.

Upon receiving the entity score report 210 and the candidate terms 212, the key entity classification manager 116 may determine associations between the entities from the entity score report 210 and the received candidate terms 212. For example, in one or more embodiments, the key entity classification manager 116 may determine a subset of entities from the entity score report 210 that are associated with at least one of the received candidate terms 212. As mentioned above, the key entity classification manager 116 may determine the associations between entities and candidate terms by applying a classification model to the entities from the entity score report 210 and the candidate terms 212.

In one or more embodiments, the key entity classification manager 116 determines the associations by first determining a semantic meaning for each of the candidate terms 212. Where the candidate terms 212 are common terms for which a classification model is already trained, determining a semantic meaning for a given candidate term may simply involve identifying a corresponding similar term from any number of terms for which the classification model is already trained to recognize. Alternatively, in one or more embodiments, the key entity classification manager 116 may identify or otherwise determine a term from a set of terms that the classification model is trained to recognize to use in determining associations between the candidate terms and the various entities from the entity score report 210.

While a variety of classification models may be used in determining associations between the entities and corresponding candidate terms, in at least one implementation, the key entity classification manager 116 determines the associations between the entities and candidate terms by applying a zero-shot classification model to the various entities and candidate terms 212 to determine the associations. For example, in one or more embodiments, the key entity classification manager 116 obtains a zero-shot classification model that has been trained on a general knowledge base of terms and entities to associate the terms and the entities with one another. As noted above, the key entity classification manager 116 may identify one or more of the terms that match a semantic meaning of the one or more candidate terms 212 to use in determining the associations between the entities and the terms on which the zero-shot classification model was trained.

The key entity classification manager 116 may determine the associations between the entities and candidate terms 212 based on estimations or probabilities associated with the entities and candidate terms. Nevertheless, a significant number of entities extracted from the digital content items may have little to do with a given set of candidate terms for a domain of interest. Accordingly, in one or more embodiments, the candidate terms 212 may include a non-classification term, such as "other" or "not applicable" that the key entity classification manager 116 may consider in determining the associations between the candidate terms 212 and the extracted set of entities. In categorizing or otherwise determining the associations between the entities and candidate terms 212, the key entity classification manager 116 may therefore associate any of the entities from the entity score report 210 with the non-classification term based on the classification model indicating that a corresponding entity is not specifically associated with any of the candidate terms 212 for the domain of interest. In one or more embodiments, this non-categorization serves as a criteria for excluding a specific entity from a subset of key entities that are associated with the domain of interest.

By associating a portion of the extracted entities with a non-classification term, the key entity classification manager 116 may significantly limit a number of key entities to consider in generating a correlation graph or otherwise generating a presentation of the key entities and associated correlations (e.g., co-occurrences) via an end-user device. This act of filtering non-related entities will reduce complexity of any resulting presentation and, in some instances, enable the client device 104 and/or computing device(s) 102 to store a graph or matrix of the subset of entities and corresponding data without using as much storage space. In addition, this act of filtering non-related entities reduces a number of nodes within a presented graph in a way that enables an end-user to focus any queries to provide a more relevant query output.

As shown in FIG. 2, the key entity classification manager 116 may output an extraction report 214 including any of the information output by the various components of the customizable entity extraction system 108. For example, in one or more embodiments, the key entity classification manager 116 outputs an extraction report including an identified subset of entities (e.g., key entities) based on those entities having a higher importance score in combination with the subset of entities being associated with the candidate terms 212. For example, the key entity classification manager 116 may output an extraction report 214 including any number of key entities that satisfy a threshold importance score and which are determined to be associated with at least one of the candidate terms 212. In one or more embodiments, the extraction report 214 includes a top rated entity from the extracted set of entities 208 (or from the entity score report 210) that is associated with each of the candidate terms 212. Thus, in one or more embodiments, the key entity classification manager 116 may identify a top entity for each of the candidate terms 212 provided as input to the key entity classification manager 116.

As shown in FIG. 2, the key entity classification manager 116 may provide the extraction report 214 to any of a variety of computing devices 216. For example, in one or more embodiments, the key entity classification manager 116 provides the extraction report 214 and any associated data for storage on a server device that is accessible to various client devices over the cloud. As an alternative, the key entity classification manager 116 may provide the extraction report 214 to a personal computing device, such as a personal computer or a mobile device, such as a smart phone. In each of the examples, the computing device 216 may utilize the extraction report 214 to generate or present a display showing the key entities and various associations with the candidate terms and/or other entities from the collection of digital content items 204. For example, as mentioned above, the key entity presentation system 116 may generate and present a correlation graph object including nodes representative of the key entities and edges between the various nodes indicating co-occurrences (or frequency of co-occurrences) between the key entities and one or more additional terms that are found in the text portions of the digital content items 204.

As noted above, there are a number of benefits that the workflow 200 provides in connection with generating and providing the extraction report 214. For example, by first extracting the text portions 206 from the digital content items 204, the customizable entity extraction system 108 can reduce processing expenses when analyzing digital content items to determine entities mentioned therein. Moreover, this extraction of text enables the customizable entity extraction system 108 to evaluate text content from any number of content platforms independent of the format of content shared on the platforms.

In addition, by applying the rule-based model(s) to the extracted text portions, the customizable entity extraction system 108 can significantly reduce a quantity of text that the machine learning models would analyze in determining the importance scores as well as determining correlations between the entities and the candidate terms. Indeed, by first extracting the terms using a rule-based model, the customizable entity extraction system 108 may provide the extracted terms to the classification model as an alternative to much more difficult to parse unstructured text. This enables the classification model to determine the associations without evaluating unstructured text, which requires significantly more processing power than the embodiments described herein.

In addition to reducing processing expense, the customizable entity extraction system 108 facilitates associating any number of entities with a flexible set of candidate terms. For example, an individual or organization may add or remove candidate terms from the associated text based on additional information that comes available with respect to a related industry. Moreover, because the classification model is a zero-shot model trained to determine associations with a general set of terms, the candidate terms may be substituted altogether with a different set of terms associated with a completely different industry. Thus, the customizable entity extraction system 108 may be used in a similar fashion across different domains of interest to accurately identify associations between entities and candidate terms.

Figure 3:
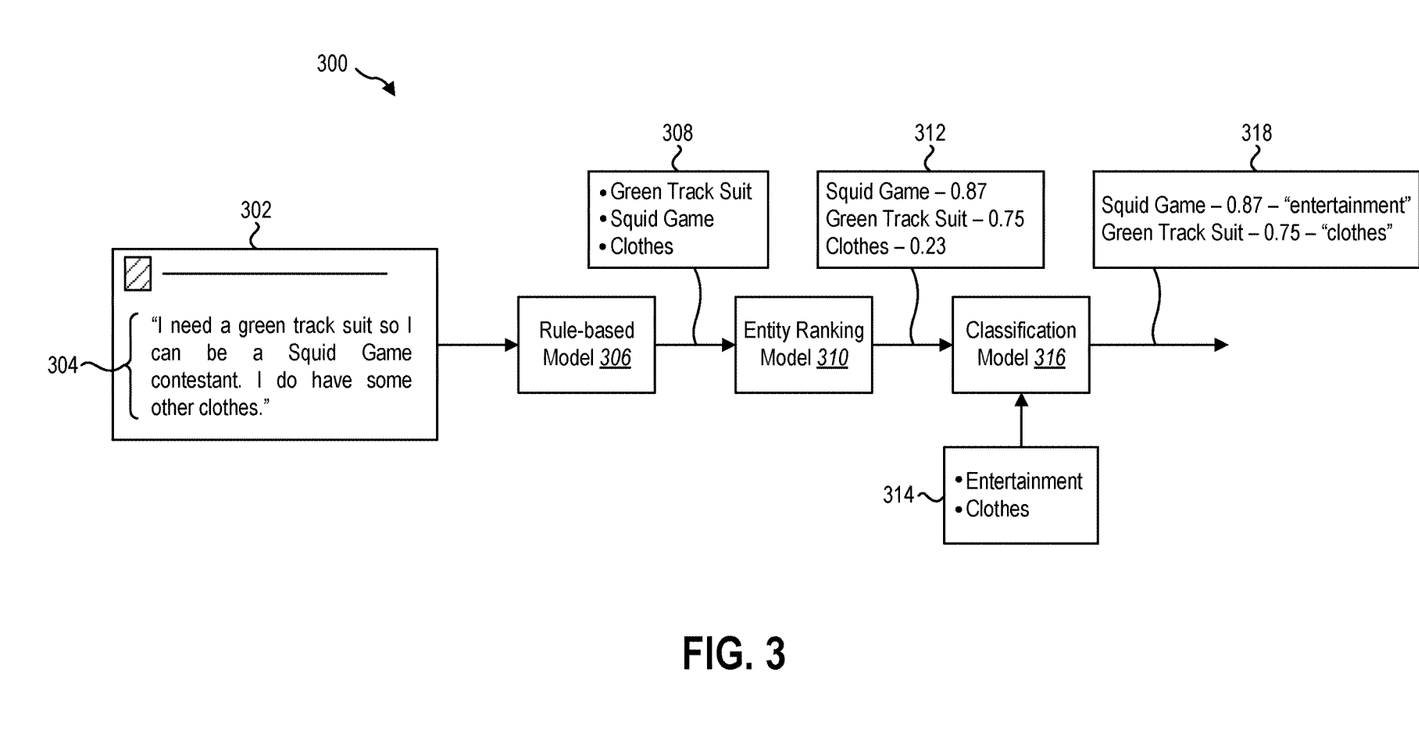
FIG. 3 illustrates an example workflow showing an application of the customizable entity extraction system on an example digital content items in accordance with one or more embodiments.

As shown in the example workflow 200 illustrated in FIG. 2, the customizable entity extraction system 108 can apply the various models to digital content items and candidate terms to generate an extraction report for a large number of digital content items. FIG. 3 illustrates another example implementation showing application of the models with respect to a single digital content item. In particular, FIG. 3 illustrates an example workflow 300 showing an example implementation of the customizable entity extraction system 108 with respect to a single text portion of a social networking post. In the interest of brevity, FIG. 3 illustrates an example workflow 300 indicating how a previously extracted text portion of a digital content item may be processed by the customizable entity extraction system 108.

As shown in FIG. 3, a customizable entity extraction system 108 may access a shared social networking post 302 (or simply "a post 302") including a text portion 304 that reads "I need a green track suit so that I can be a Squid Game contestant. I do have some other clothes." Similar to one or more embodiments described herein, the text portion 304 of the post 302 may be provided as an input to a rule-based model 306 configured to extract one or more entities from the text portion 304 of the post 302. Similar to one or more embodiments described herein, the rule-based model 306 may include a set of rules for identifying selective entities from the text portion 304 that fit certain criteria defined by the rule-based model 306.

As shown in FIG. 3, the rule-based model 304 may be applied to the text portion 304 of the post 302 to output a set of entities 308. As shown in FIG. 3, the set of entities 308 may include a listing of terms including, by way of example, "green track suit," "Squid Game," and "clothes." Consistent with one or more embodiments described herein, these terms may be identified based on the static set of rules and independent of importance of the specific terms within the text portion 304 of the post 302 or within a collection of additional digital content items that the post 302 is drawn from.

As shown in FIG. the post 302 and the set of extracted entities 308 may be fed as inputs to an entity ranking model 310 to determine a metric of importance of the identified entities with respect to other entities and terms from the post 302. As indicated above, the entity ranking model 310 may be trained to determine importance scores for the entities indicating metrics of importance of the respective entities within the text portion 304 of the post 302. In one or more embodiments, the entity ranking model 310 considers an importance of the respective entities within the specific post 302. In addition, or as an alternative, the entity ranking model 310 may consider importance of the entities with respect to a larger corpus of social networking posts (and/or other digital content items).

As shown in FIG. 3, the entity ranking model 310 may be applied to the text portion 304 and the identified entities 308 to determine importance scores for each of the entities 308. As shown in FIG. 3, the ranking model 310 may output a set of entity scores 312 including, by way of example, "Squid Game—0.87," "green track suit—0.75," and "clothes—0.23." While not shown in FIG. 3, the clothes entity may be excluded or otherwise filtered out of the set of entities 308 at this stage based on the clothes importance score falling below some predetermined threshold. Nevertheless, in one or more embodiments, each of the entities (or filtered set of entities having importance scores above a threshold) and associated importance scores are provided to a classification model 316 for further processing.

As shown in FIG. 3, the classification model 316 may receive the set of entity scores 312 (including the entities and associated scores) and a set of candidate terms 314 as inputs to the classification model 316. In the example shown in FIG. 3, the candidate terms may include terms such as "entertainment" and "clothes" based on a desire of an individual or organization to view associations between key entities and candidate terms of entertainment and clothes. As noted above, the candidate terms 314 are customizable and may be any number of terms associated with any domain of interest.

The classification model 316 may process the inputs in a variety of ways. In one or more embodiments, the classification model 316 determines semantic meaning for the candidate terms 314. For example, where the classification model 316 is trained to determine associations between a set of input entities and a set of base terms on which the classification model 316 is trained, the classification model 316 may determine which of the base terms and candidate terms 314 have a semantic meaning similar to the input entities. Where the entity is classified into one of the candidate terms, the entity may be extracted in accordance with one or more embodiments described herein. In this way, the classification model 316 may utilize previous training on the base terms to determine associations between the set of candidate terms 314 and the entities from the set of entity scores 312.

As noted above, the classification model 316 may refer to a variety of models including, in some instances, a machine learning model trained to associate a set of terms (e.g., base terms, candidate terms) with one or more input entities. In one or more embodiments, the classification model 316 refers to a zero-shot classification model having been trained to associate a given input term with at least one term from a set of base terms and where the zero-shot classification model is trained based on training data that is independent from the candidate term(s) or the collection of entities provided as input to the classification model 316.

Consistent with one or more embodiments described herein, the classification model 316 may be trained to first, associate a semantic meaning of a candidate term to one or more base terms from a set of base terms embedded within a code of the classification model 316. The classification model 316 may then receive the entities output from the ranking model 310 as a first input to the classification model 316. The classification model 316 may then determine associations between a subset of entities with the candidate term(s) based on determined associations between the subset of entities and the base term(s) previously associated with the semantic meaning of the candidate terms 312.

As shown in FIG. 3, the classification model 316 may generate and output an extraction report 318 including any information generated by the various models 306, 310, 316. For example, the extraction report 318 may include a set of entities extracted from the text portion of the post 302. The extraction report 318 may additionally include any importance scores determined for the respective entities. The extraction report 318 may further include an indicated subset of the entities based on importance of the entities within the extracted set of entities as well as associations with respective candidate terms associated with a domain of interest. In the example shown in FIG. 3, the extraction report 318 may include a listing of the terms "Squid Game—0.87—entertainment" and "green track suit—0.75—clothes" indicating that the terms "Squid Game" and "green track suit" have the highest relative importance of the extracted terms that are associated with the candidate terms "entertainment" and "clothes."

As noted in one or more implementations described above, the extraction report 318 may be provided to a key entity presentation system 118 for further analysis. In one or more embodiments, the key entity presentation system 118 generates a correlation graph object based on co-occurrences of the key entities from the extraction report and other terms found within a corpus of digital content items. In one or more embodiments, the extraction report 318 is provided to a client device for locally generating a presentation and/or executing search queries with respect to the key entities, candidate terms, and other terms from digital content items.

Figure 4:
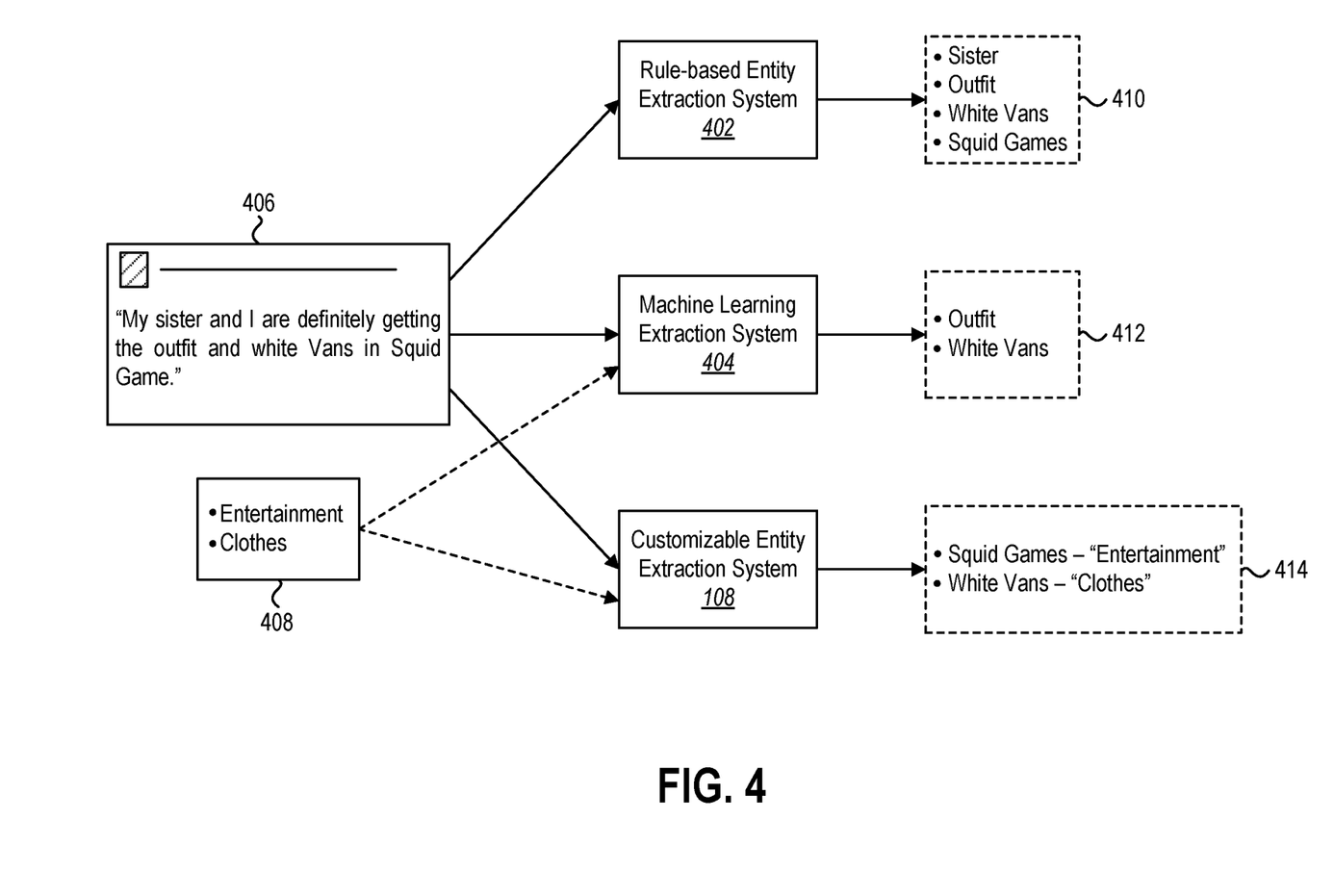
FIG. 4 illustrates a comparison between outputs of conventional data classification approaches and the customizable entity extraction system in accordance with one or more embodiments.

Moving on, FIG. 4 provides an example implementation showing differences between features of the customizable entity extraction system 108 and other conventional approaches to identifying key entities within digital content items. For example, FIG. 4 illustrates a rule-based entity extraction system 402, a machine learning extraction system 404, and the customizable entity extraction system 108 including a combined rules-based and machine-learning based approach to selectively identifying a subset of key entities associated with a particular domain of interest from a corpus of digital content items.

In the illustrated example, a single post 406 is shown including a text portion that reads "My sister and I are definitely getting the outfit and white vans in Squid Game." In addition to the post 406, each of the systems are instructed to identify key terms relevant to a set of candidate terms 408 for a domain of interest inclusive of "entertainment" and "shoes." It will be noted that the rule-based entity extraction system 402 may not necessarily receive the candidate terms 408 as an input as the set of rules for identifying various entities from the post 406 are a set of static rules that identify key entities independent of other customizable parameters.

In a first example, the rule-based entity extraction system 402 generate a first output 410 including a set of entities. The output set of entities may include "sister," "outfit," "white vans," and "Squid Game." As noted above, a strictly rule-based approach often produces an overinclusive set of terms with one or more terms that are less relevant to a given domain of interest. In a second example, the machine learning extraction system 404 generates a second output 412 including a set of entities. The output set of entities may include "output" and "white vans" based on unique training of the machine learning model for determining correlations between candidate terms and entities from the post 406.

In a third example, the customizable entity extraction system 108 implements a combination of rule-based and machine-learning models as discussed in connection with various implementations herein to generate a third output

414 including a set of entities. The set of entities may include "Squid Game" and "white vans," thus providing an accurate listing of key entities from the text portion of the input post 406. This is made possible by applying the rule-based model to identify a set of entities and determining metrics of importance of the various entities with respect to the post 406 and/or additional digital content items. This enables the customizable entity extraction system 108 to specifically identify "Squid Game" as a key entity where the other models may fail to identify this relevant term. In addition, by using a zero-shot classification model, the customizable entity extraction system 108 additionally enables customization of the candidate terms to provide the ability of the customizable entity extraction system 108 to identify key entities across a variety of domains of interest without needing to retrain the classification model, as would be the case with a conventional machine learning extraction system 404.

Figure 5:
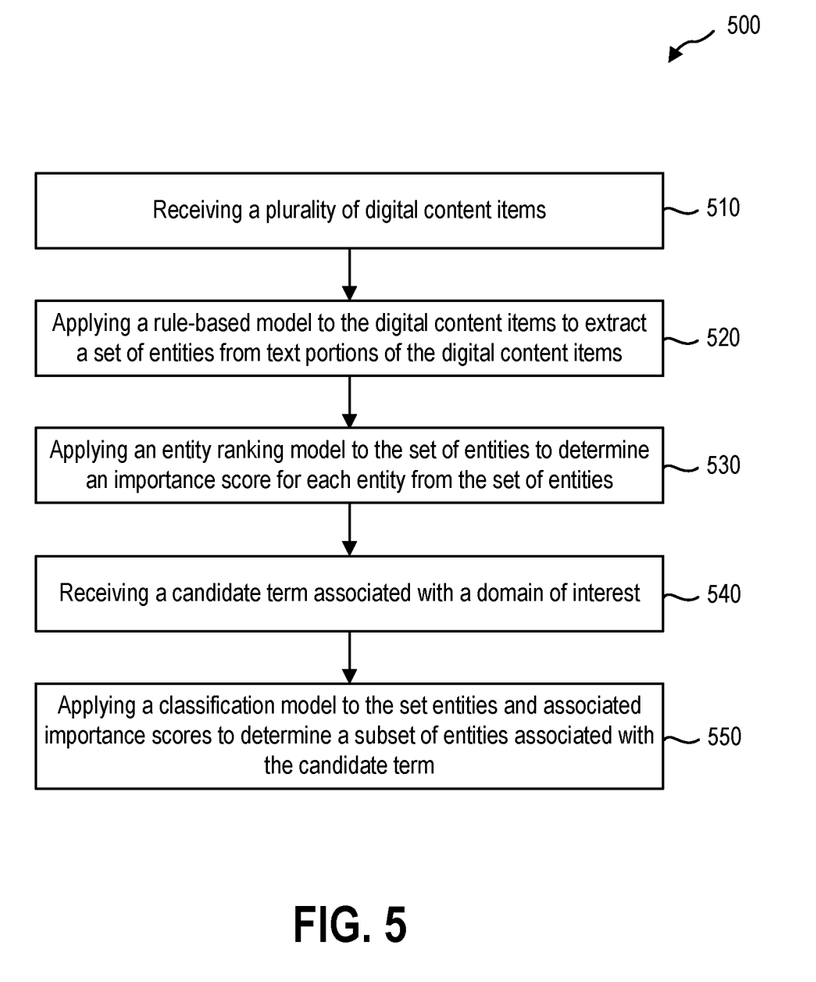
FIG. 5 illustrates an example series of acts for extracting and classifying data from digital content items in accordance with one or more embodiments.

Turning now to FIG. 5, this figure illustrates example flowcharts including series of acts for identifying a subset of key entities from a text portion of a digital content item using a combined rule-based and classification model-based approach in accordance with one or more embodiments described herein. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

For example, FIG. 5 illustrates a series of acts 500 for identifying a subset of key entities from a text portion of a digital content item using a combined rule-based and classification model-based approach. As shown in FIG. 5, the series of acts 500 includes an act 510 of receiving a plurality of digital content items. In one or more embodiments, the digital content items include unstructured text content. Further, in one or more embodiments, the collection of entities include identified terms of the unstructured text content. In one or more embodiments, the plurality of digital content items includes text portions of a plurality of posts shared by users of a social networking system.

As further shown, the series of acts 500 may include an act 520 of applying a rule-based model to the digital content items to extract a set of entities from text portions of the digital content items. For example, in one or more implementations, the act 520 involves applying a rule-based model to the plurality of digital content items to extract a collection of entities from the plurality of digital content items, the rule-based model including a set of rules for identifying at least one key entity from a text portion of a given digital content item.

As further shown, the series of acts 500 may include an act 530 of applying an entity ranking model to the set of entities to determine an importance score for each entity from the set of entities. For example, in one or more implementations, the act 530 involves applying an entity ranking model to the collection of entities to determine an importance score for each entity from the collection of entities, the importance score indicating a metric of importance of an associated entity within an associated digital content item from the plurality of digital content items.

As further shown, the series of acts 500 may include an act 540 of receiving a candidate term (or multiple terms) associated with a domain of interest. As further shown, the series of acts 500 may include an act 550 of applying a classification model to the set of entities and associated importance scores to determine a subset of entities associated with the candidate term(s).

In one or more embodiments, the rule-based model includes a static set of rules that can be uniformly applied to a given portion of text to identify at least one term from the given portion of text based on characteristics of the terms within the given portion of text. In one or more embodiments, the entity ranking model includes a machine learning model trained to output an importance score for a given entity within a digital content item. The importance score for each entity may be determined based on a frequency of each entity within the plurality of digital content item.

In one or more embodiments, the candidate term has a semantic meaning. Further, in one or more implementations, the classification model is trained to determine a semantic meaning for a given candidate term.

In one or more embodiments, the classification model is a zero-shot classification model having been trained to associate a given input term with at least one term from a set of base terms. In one or more embodiments, the zero-shot classification model is trained based on training data that is independent from the candidate term or the collection of entities provided as input to the zero-shot classification model. In one or more embodiments, the classification model is configured to associate a semantic meaning of the candidate term to a base term from a set of base terms embedded within a code of the classification model and receive the collection of entities as input entities to the classification model. The classification model may further be configured to associate the subset of entities from the collection of entities with the candidate term based on a determined association between the subset of entities and the base term.

In one or more embodiments, the series of acts 500 includes determining a filtered set of entities from the collection of entities based on importance scores of the filtered set of entities being greater than or equal to a threshold importance score. In one or more embodiments, applying the classification model to the collection of entities includes providing the filtered set of entities as input to the classification model. In this example, the subset of entities may refer to a subset of the filtered set of entities based on determined associations between the subset of entities and the candidate term(s).

In one or more embodiments, the series of acts 500 includes generating an extraction report for the plurality of digital content items, the extraction report including a listing the subset of entities from the plurality of digital content items and indications of an estimated importance of the respective entities based on importance scores for the subset of entities determined by the entity ranking model. In one or more embodiments, the series of acts 500 includes generating a correlation graph object for the collection of digital content items including a plurality of nodes associated with the subset of entities and a plurality of edges based on co-occurrence of the subset of entities and one or more additional terms included within the collection of digital content items.

Figure 6:
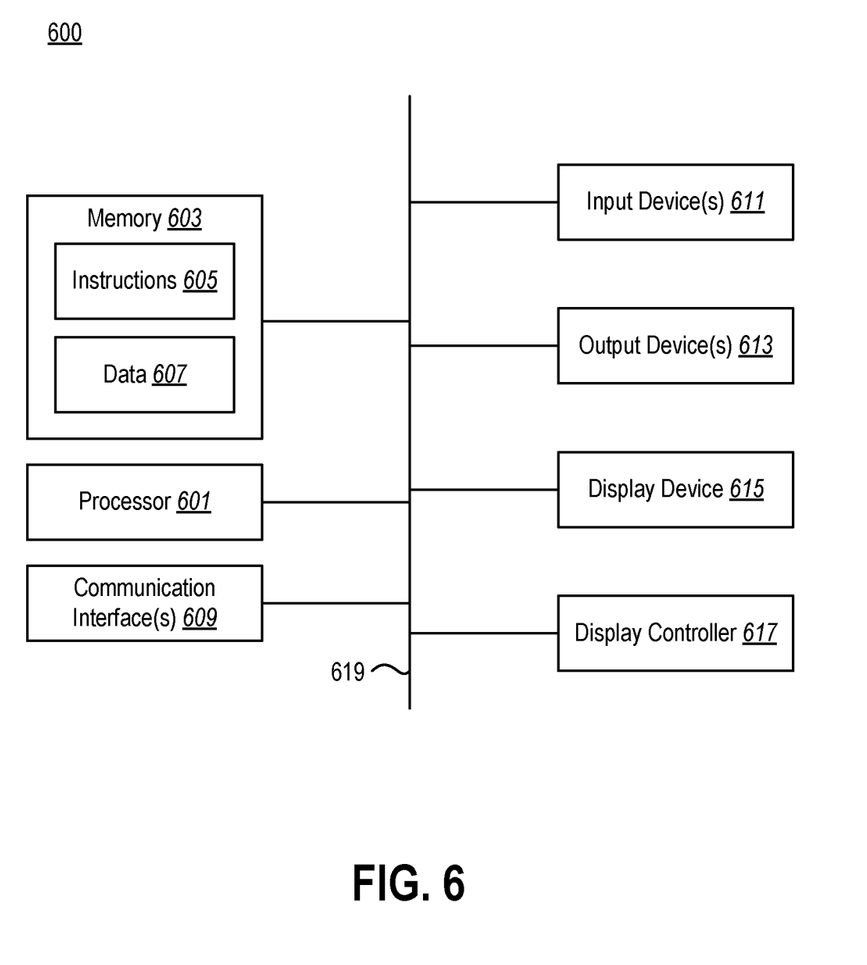
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used. In one or more embodiments, the computer system 600 further includes one or more graphics processing units (GPUs), which can provide processing services related to both entity classification and graph generation.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a plurality of digital content items, the plurality of digital content items including a collection of entities contained within unstructured text portions of the plurality of digital content items;
   applying a rule-based model to each digital content item from the plurality of digital content items to extract a proper subset of entities of the collection of entities, the rule-based model including a static set of rules to be applied to an unstructured text portion of a given digital content item for identifying any number of entities from the given digital content item for inclusion in the proper subset of entities;
   selectively applying an entity ranking machine learning model only to the proper subset of entities of the collection of entities to determine an importance score for each entity from the proper subset of entities, the entity ranking machine learning model being trained to output an importance score for a given entity within a given digital content item, the importance score indicating a metric of importance of an associated entity within an associated digital content item from the plurality of digital content items;

receiving, based on a user input, a candidate term associated with a domain of interest; and applying a zero-shot classification model to the proper subset of entities and associated importance scores to determine key entities from the collection of entities associated with the candidate term, the zero-shot classification model being trained to associate a given input term with at least one term from a set of base terms embedded within a code of the zero-shot classification model, the set of base terms being independent from the candidate terms or the proper subset of entities extracted from the plurality of digital content items.

2. The method of claim 1, wherein the proper subset of entities include a proper subset of terms from the unstructured text content.

3. The method of claim 1, wherein the static set of rules of the rule-based model can be uniformly applied to a given portion of text to identify at least one term from the given portion of text based on characteristics of the terms within the given portion of text.

4. The method of claim 1, wherein the importance score for each entity from the proper subset of entities is determined based on a frequency of each entity within a corpus of text represented by the plurality of digital content items.

5. The method of claim 1, wherein the candidate term has a semantic meaning, and wherein the zero-shot classification model is trained to determine a semantic meaning for a given candidate term.

6. The method of claim 1, wherein the zero-shot classification model is configured to:
associate a semantic meaning of the candidate term to a base term from the set of base terms embedded within the code of the zero-shot classification model;
receive one or more entities as input entities to the zero-shot classification model; and
associate the one or more entities with the candidate term based on a determined association between the one or more entities and the base term.

7. The method of claim 1, further comprising determining a filtered set of entities from the proper subset of entities based on importance scores of the filtered set of entities being greater than or equal to a threshold importance score.

8. The method of claim 7, wherein applying the zero-shot classification model to the proper subset of entities includes selectively providing only the filtered set of entities as inputs to the zero-shot classification model, and wherein the filtered set of entities is a filtered subset of the proper subset of entities based on determined associations between the proper subset of entities and the candidate term.

9. The method of claim 1, wherein the plurality of digital content items includes text portions of a plurality of posts shared by users of a social networking system.

10. The method of claim 1, further comprising generating an extraction report for the plurality of digital content items, the extraction report including a listing of the proper subset of entities from the plurality of digital content items and indications of an estimated importance of respective entities from the proper subset of entities based on importance scores for the proper subset of entities determined by the entity ranking machine learning model.

11. The method of claim 10, further comprising generating a correlation graph object for the collection of digital content items including a plurality of nodes associated with the proper subset of entities and a plurality of edges based on co-occurrence of the proper subset of entities and one or more additional terms included within the collection of digital content items.

12. A system, comprising:
at least one processor;
memory in electronic communication with the at least one processor; and
instructions stored in the memory, the instruction being executable by the at least one processor to:
receive a plurality of digital content items, the plurality of digital content items including a collection of entities contained within unstructured text portions of the plurality of digital content items;
apply a rule-based model to each digital content item from the plurality of digital content items to extract a proper subset of entities of the collection of entities, the rule-based model including a static set of rules to be applied to an unstructured text portion of a given digital content item for identifying any number of entities from the given digital content item for inclusion in the proper subset of entities;
selectively apply an entity ranking machine learning model only to the proper subset of entities of the collection of entities to determine an importance score for each entity from the proper subset of entities, the entity ranking machine learning model being trained to output an importance score for a given entity within a given digital content item, the importance score indicating a metric of importance of an associated entity within an associated digital content item from the plurality of digital content items;
receive, based on a user input, a candidate term associated with a domain of interest; and
apply a zero-shot classification model to the proper subset of entities and associated importance scores to determine key entities from the collection of entities associated with the candidate term, the zero-shot classification model being trained to associate a given input term with at least one term from a set of base terms embedded within a code of the zero-shot classification model, the set of base terms being independent from the candidate terms or the proper subset of entities extracted from the plurality of digital content items.

13. The system of claim 12, wherein the proper subset of entities include a proper subset of terms from the unstructured text content, and wherein the static set of rules of the rule-based model can be uniformly applied to a given portion of text to identify at least one term from the given portion of text based on characteristics of the terms within the given portion of text.

14. The system of claim 12, wherein the importance score for each entity from the proper subset of entities is determined based on a frequency of each entity within the plurality of digital content items.

15. The system of claim 12, wherein the zero-shot classification model is configured to:
associate a semantic meaning of the candidate term to a base term from the set of base terms embedded within the code of the zero-shot classification model;

receive one or more entities as input entities to the zero-shot classification model; and associate the one or more entities with the candidate term based on a determined association between the one or more entities and the base term.

16. The system of claim 12, further comprising instruction being executable by the at least one processor to determine a filtered set of entities from the proper subset of entities based on importance scores of the filtered set of entities being greater than or equal to a threshold importance score.

17. The system of claim 16, wherein applying the zero-shot classification model to the proper subset of entities includes selectively providing only the filtered set of entities as inputs to the zero-shot classification model, and wherein the filtered set of entities is a filtered subset of the proper subset of entities based on determined associations between the proper subset of entities and the candidate term.

18. The system of claim 12, wherein the plurality of digital content items includes text portions of a plurality of posts shared by users of a social networking system.

19. A non-transitory computer readable medium storing instructions thereon that, when executed by at least one processor, causes a computing device to:

receive a plurality of digital content items, the plurality of digital content items including a collection of entities contained within unstructured text portions of the plurality of digital content items;

apply a rule-based model to each digital content item from the plurality of digital content items to extract a proper subset of entities of the collection of entities, the rule-based model including a static set of rules to be applied to an unstructured text portion of a given digital content item for identifying any number of entities from the given digital content item for inclusion in the proper subset of entities;

selectively apply an entity ranking machine learning model only to the proper subset of entities of the collection of entities to determine an importance score for each entity from the proper subset of entities, the entity ranking machine learning model being trained to output an importance score for a given entity within a given digital content item, the importance score indicating a metric of importance of an associated entity within an associated digital content item from the plurality of digital content items;

receive, based on a user input, a candidate term associated with a domain of interest; and apply a zero-shot classification model to the proper subset of entities and associated importance scores to determine key entities from the collection of entities associated with the candidate term, the zero-shot classification model being trained to associate a given input term with at least one term from a set of base terms embedded within a code of the zero-shot classification model, the set of base terms being independent from the candidate terms or the proper subset of entities extracted from the plurality of digital content items.

20. The non-transitory computer readable medium of claim 19, wherein the instructions, when executed by the at least one processor, further cause the computing device to:

determine a filtered set of entities from the proper subset of entities based on importance scores of the filtered set of entities being greater than or equal to a threshold importance score, wherein applying the zero-shot classification model to the proper subset of entities includes selectively providing only the filtered set of entities as inputs to the zero-shot classification model, wherein the filtered set of entities is a filtered subset of the proper subset of entities based on determined associations between the subset of entities and the candidate term.

\* \* \* \* \*